(12) United States Patent
Tsubouchi et al.

(10) Patent No.: US 11,397,115 B2
(45) Date of Patent: Jul. 26, 2022

(54) TEMPERATURE DETECTION LABEL AND ARTICLE MANAGEMENT DEVICE USING SAME

(71) Applicant: Hitachi, Ltd., Tokyo (JP)

(72) Inventors: Shigetaka Tsubouchi, Tokyo (JP); Kohhei Aida, Tokyo (JP); Shunsuke Mori, Tokyo (JP); Masahiro Kawasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 191 days.

(21) Appl. No.: 16/763,655

(22) PCT Filed: Nov. 21, 2018

(86) PCT No.: PCT/JP2018/042964
§ 371 (c)(1),
(2) Date: May 13, 2020

(87) PCT Pub. No.: WO2019/142485
PCT Pub. Date: Jul. 25, 2019

(65) Prior Publication Data
US 2020/0278263 A1 Sep. 3, 2020

(30) Foreign Application Priority Data

Jan. 22, 2018 (JP) .............................. JP2018-007802

(51) Int. Cl.
*G01K 11/12* (2021.01)
*G01K 11/06* (2006.01)
(Continued)

(52) U.S. Cl.
CPC ................ *G01K 11/12* (2013.01); *G01K 3/04* (2013.01); *G01K 11/06* (2013.01); *B41M 3/14* (2013.01); *B41M 3/142* (2013.01); *G01N 31/229* (2013.01)

(58) Field of Classification Search
CPC .......... G01K 11/12; G01K 3/04; G01K 11/06; B41M 3/14; B41M 3/142; G01N 31/229
See application file for complete search history.

(56) References Cited

U.S. PATENT DOCUMENTS 5,476,792 A * 12/1995 Ezrielev ................... G01K 3/04
116/219
5,663,115 A * 9/1997 Naito ..................... B41M 5/305
503/201

(Continued)

FOREIGN PATENT DOCUMENTS

CN 201326350 Y 10/2009
CN 201584111 U 9/2010
(Continued)

OTHER PUBLICATIONS

Chinese-language Office Action issued in Chinese Application No. 201880077977.X dated Feb. 3, 2021 with English translation (31 pages).

(Continued)

*Primary Examiner* — Lisa M Caputo
*Assistant Examiner* — Philip L Cotey
(74) *Attorney, Agent, or Firm* — Crowell & Moring LLP

(57) ABSTRACT

The present invention addresses the problem of providing a temperature detection label capable of preventing falsification using a simple structure. To solve this problem, the present invention provides a temperature detection label that is characterized by comprising a supporting member and a temperature detection part provided on the supporting member and in that: the temperature detection part has a temperature detection material that, in a heating process, starts color development at temperature $T_1$ and starts losing color as a result of melting at temperature $T_2$ and, in a cooling process, solidifies while remaining colorless by being cooled to temperature $T_1$ or lower; the temperature detection mate- (Continued)

rial includes a leuco dye, decolorizer, and developer; and the temperature detection label also comprises a member having an appearance that changes between $T_1$ and $T_2$, inclusive, or a high-melting-point material having a melting point or glass transition temperature higher than $T_2$.

14 Claims, 17 Drawing Sheets

(51) Int. Cl.
*G01K 3/04* (2006.01)
*B41M 3/14* (2006.01)
*G01N 31/22* (2006.01)

(56) References Cited

U.S. PATENT DOCUMENTS

| | | | | |
|---|---|---|---|---|
| 5,849,651 | A * | 12/1998 | Takayama | B41M 5/3375 |
| | | | | 503/216 |
| 5,909,232 | A * | 6/1999 | Goto | G06K 15/029 |
| | | | | 347/187 |
| 6,010,808 | A * | 1/2000 | Naito | B41M 5/305 |
| | | | | 503/201 |
| 6,313,066 | B1 * | 11/2001 | Takayama | B41M 5/305 |
| | | | | 503/201 |
| 6,382,125 | B1 * | 5/2002 | Tamura | B41M 5/28 |
| | | | | 116/207 |
| 6,830,707 | B2 * | 12/2004 | Tamura | B41M 5/3375 |
| | | | | 106/31.16 |
| 7,335,624 | B2 * | 2/2008 | Senga | B41M 5/284 |
| | | | | 503/201 |
| 2002/0026002 | A1 * | 2/2002 | Tamura | B41M 5/3375 |
| | | | | 524/323 |
| 2004/0222780 | A1 * | 11/2004 | Yamada | G01K 3/04 |
| | | | | 324/110 |
| 2007/0238614 | A1 * | 10/2007 | Kim | B44F 1/10 |
| | | | | 503/226 |
| 2011/0084128 | A1 * | 4/2011 | Haarer | G01K 15/007 |
| | | | | 235/375 |
| 2012/0014740 | A1 * | 1/2012 | Kamitani | B43K 8/00 |
| | | | | 401/209 |
| 2012/0238446 | A1 * | 9/2012 | Tsuchimura | B41M 5/44 |
| | | | | 503/226 |
| 2014/0044609 | A1 * | 2/2014 | Prusik | G01K 11/12 |
| | | | | 422/429 |
| 2014/0106963 | A1 * | 4/2014 | Ribi | G01N 21/78 |
| | | | | 503/216 |
| 2016/0349225 | A1 * | 12/2016 | Prusik | G01K 11/12 |
| 2018/0217114 | A1 | 8/2018 | Aratani et al. | |
| 2018/0306649 | A1 | 10/2018 | Tada et al. | |

FOREIGN PATENT DOCUMENTS

| | | |
|---|---|---|
| CN | 103205250 A | 7/2013 |
| JP | 2-19155 B2 | 4/1990 |
| JP | 11-248552 A | 9/1999 |
| JP | 5547861 B1 | 7/2014 |
| JP | 2015-165212 A | 9/2015 |
| WO | WO 2017/038292 A1 | 3/2017 |
| WO | WO 2017/068657 A1 | 4/2017 |

OTHER PUBLICATIONS

International Search Report (PCT/ISA/210) issued in PCT Application No. PCT/JP2018/042964 dated Dec. 25, 2018 with English translation (two (2) pages).

Japanese-language Written Opinion (PCT/ISA/237) issued in PCT Application No. PCT/JP2018/042964 dated Dec. 25, 2018 (three (3) pages).

* cited by examiner

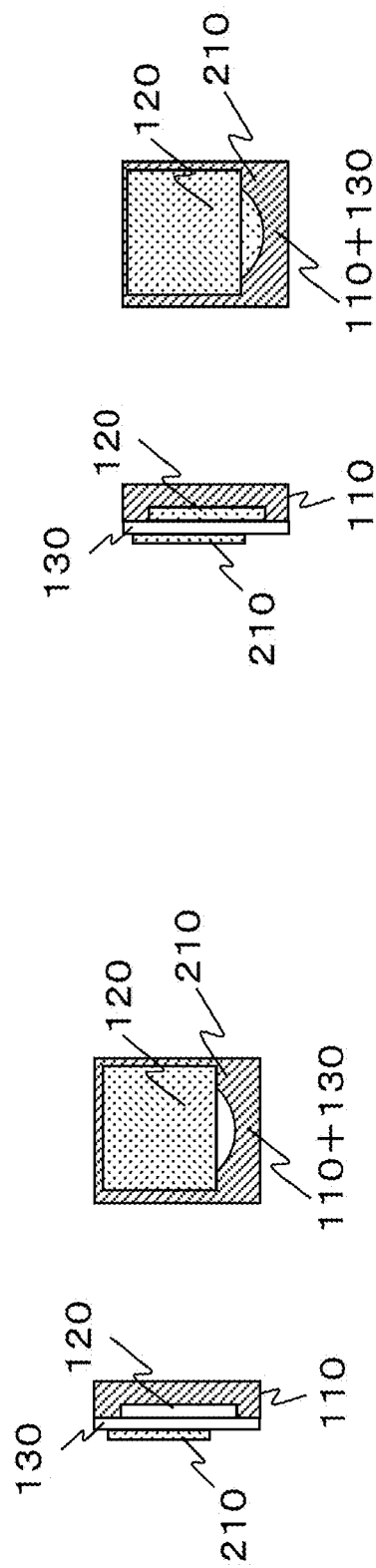

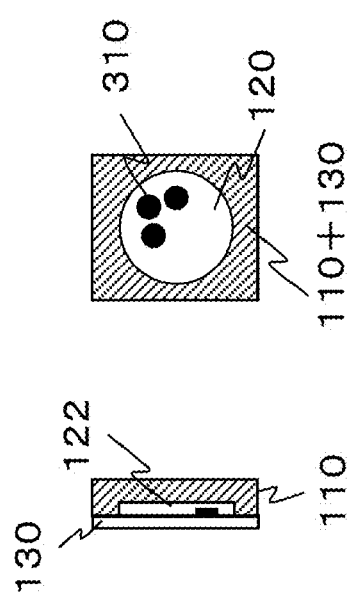

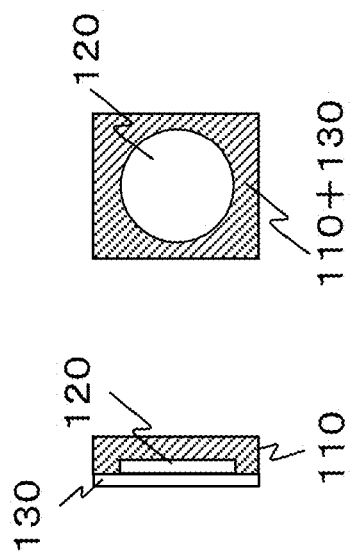

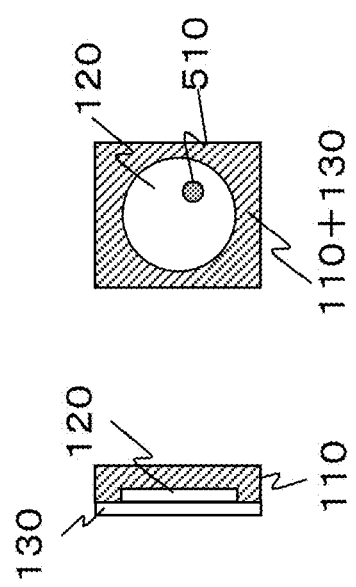

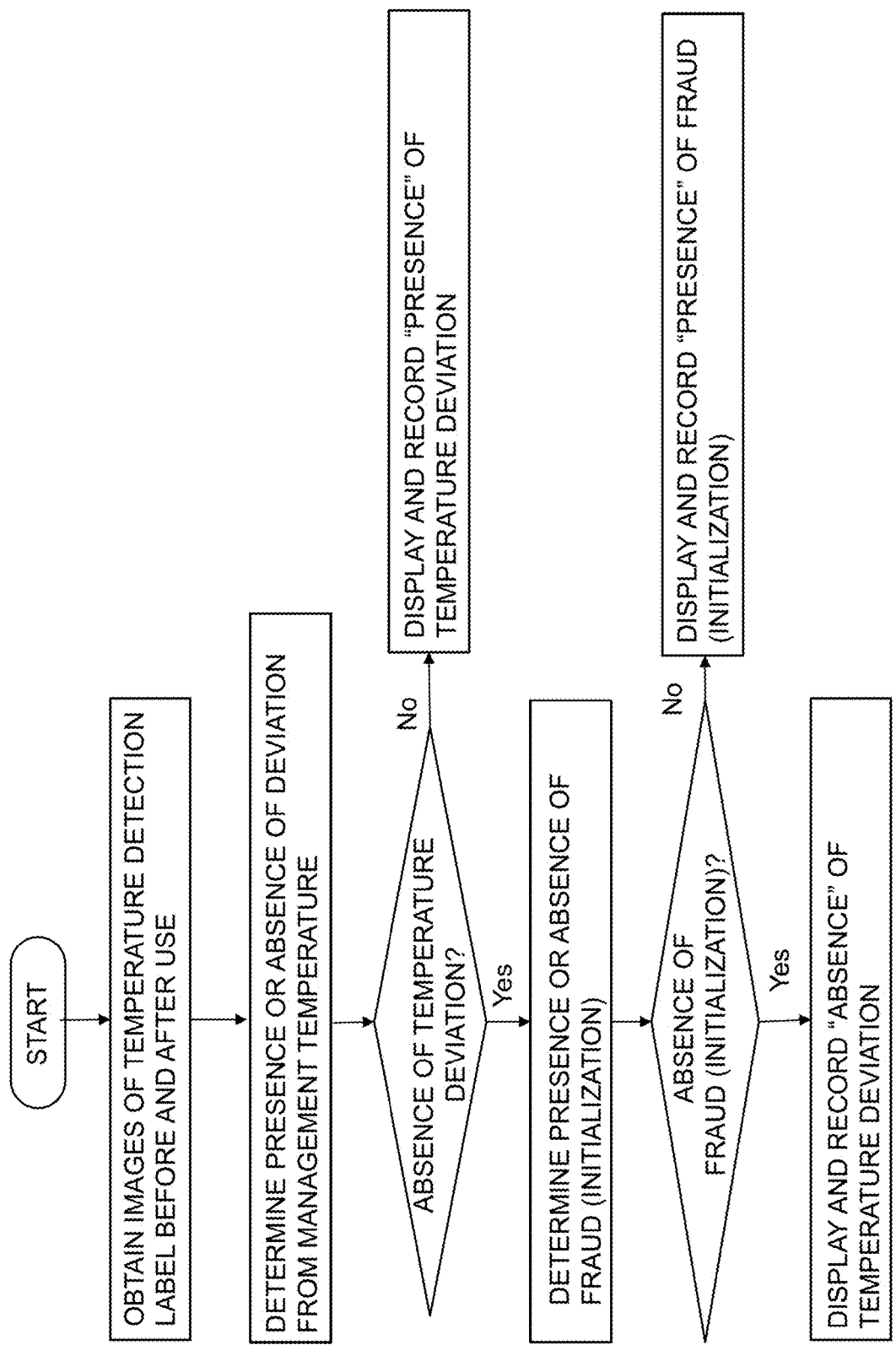

TEMPERATURE DETECTION LABEL AND ARTICLE MANAGEMENT DEVICE USING SAME

TECHNICAL FIELD

The present invention relates to a temperature detection label and an article management device using same.

BACKGROUND ART

A temperature detection label that develops color or decolors in response to temperature is used for quality management of fresh foods, pharmaceuticals, and the like that require temperature management.

Patent Literature 1 discloses a temperature-indicating agent capable of detecting both increase and decrease in temperature. The temperature-indicating agent utilizes a leuco dye and reversibly changes its color.

Patent Literature 2 discloses a temperature detector that is designed for the purpose of preventing falsification. A temperature detection material of Patent Literature 2 includes a first ink in which a temperature $T_{a1}$ at which decoloring starts during heating is different from a temperature $T_{d1}$ at which color development starts during cooling, and a second ink in which a temperature $T_{a2}$ at which decoloring starts during heating is different from a temperature $T_{d2}$ at which color development starts during cooling. The decoloring start temperature $T_{a1}$, the color development start temperature $T_{d1}$, the decoloring start temperature $T_{a2}$, and the color development start temperature $T_{d2}$ have the following relationship: $T_{d1} < T_{d2} < T_{a1} < T_{a2}$.

Thermo-sensitive labels used in any applications other than the quality management include rewritable labels on IC cards or point cards. The purpose of these displays is to visualize information inside the card to users. Even if the display is lost by intentional heating or falsified, anti-counterfeiting function is not necessary because data itself is recorded in an IC or the like. These cards are assumed to be rewritten because information stored in these cards are to be updated.

CITATION LIST

Patent Literature

Patent Literature 1: Japanese Examined Patent Application Publication No. Hei 2(1990)-19155
Patent Literature 2: WO 2017/068657

SUMMARY OF INVENTION

Technical Problem

Since the temperature-indicating agent disclosed in Patent Literature 1 is color reversible, even if it changes its color once, it can return to its original color, which is exhibited before the color change, by adjusting the temperature. The temperature management during distribution of articles requires a temperature detection material capable of detecting deviation from a management temperature and which has the function of preventing the falsification by not allowing the temperature detection material to return to the original state after the deviation.

In the temperature detector disclosed in Patent Literature 2, two kinds of inks need to exert independent temperature detection functions. Thus, it is necessary to dispose the two kinds of inks in the label or to microencapsulate the respective inks.

Therefore, an object of the present invention is to provide a temperature detection label capable of suppressing falsification using a simple structure.

To solve the above-mentioned problems, a temperature detection label according to the present invention is characterized by including: a supporting member; and a temperature detection part provided in the supporting member, in which the temperature detection part includes a temperature detection material that in a heating process, starts color development at a temperature $T_1$ and starts decoloring by being melted at a temperature $T_2$ and, in a cooling process, solidifies while remaining decolored by being cooled to the temperature $T_1$ or lower. Further, the temperature detection material includes a leuco dye, a decolorant, and a developer. The temperature detection label also includes a member having an appearance that changes at a temperature equal to or higher than $T_1$ and equal to or lower than $T_2$, or a high-melting-point material having a melting point or glass transition point higher than $T_2$.

Advantageous Effects of Invention

According to the present invention, the temperature detection label capable of suppressing falsification using a simple structure can be provided. Other problems, configurations, and effects than those described above will be apparent from the following description of embodiments.

BRIEF DESCRIPTION OF DRAWINGS

FIGS. 9A and 9B are schematic diagrams of a temperature detection label according to a second embodiment.

FIGS. 10A and 10B are schematic diagrams of the temperature detection label according to the second embodiment.

FIGS. 15A and 15B are schematic diagrams of the temperature detection label according to the third embodiment.

FIGS. 18A and 18B are schematic diagrams of the temperature detection label according to the fourth embodiment.

FIGS. 21A and 21B are schematic diagrams of the temperature detection label according to the fifth embodiment.

FIG. 24 is a diagram showing a procedure of fraud detection.

DESCRIPTION OF EMBODIMENTS

Figure 1:
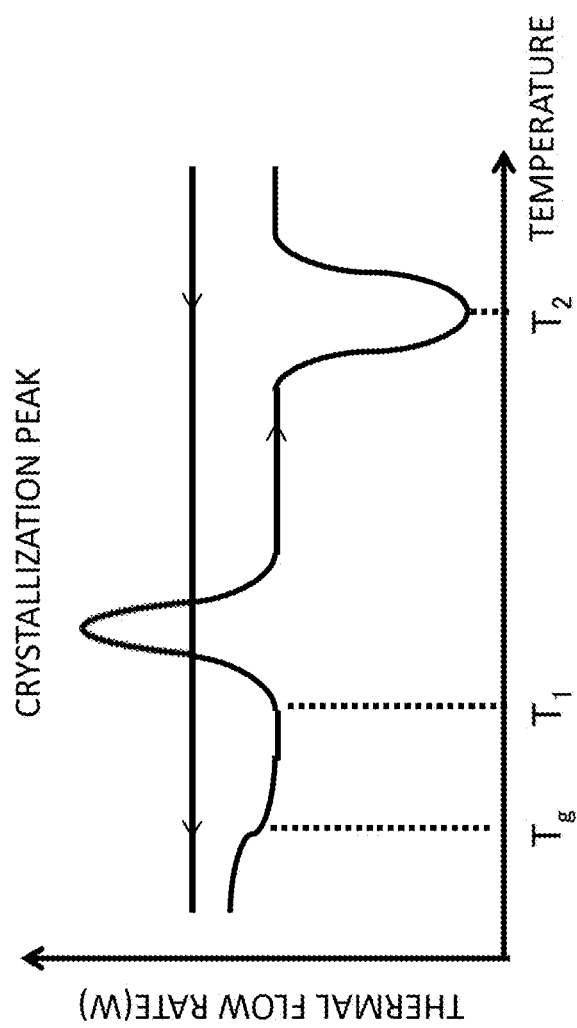
FIG. 1 is a differential scanning thermogravimetry (DSC) curve of a temperature-indicating material according to an embodiment of the present invention.

Hereinafter, embodiments of the present invention will be described with reference to the drawings and the like. The following description shows specific examples of the contents of the present invention. The present invention is not limited to the description, and various changes and modifications can be made thereto by a person skilled in the art within the scope of the technical idea disclosed in this specification. Components that have the same functions are denoted by the same reference numerals through all the drawings for explaining the present invention, and a repetitive description thereof may be omitted.

Although a temperature detection label is explained as an example in this specification, the technical idea of the present invention can also be applied to a time temperature indicator (TTI) and the like.

First Embodiment

A temperature detection label according to a first embodiment includes a supporting member, a temperature detection part provided in the supporting member, a protective layer provided to cover the temperature detection part, and a member that changes its appearance at a temperature equal to or higher than $T_1$ and equal to or lower than $T_2$, or a high-melting-point material (fraud detection member) that has a melting point or glass transition point higher than $T_2$.

<Supporting Member>

The supporting member is preferably made of a general-purpose resin. Specific examples of the resin include polyolefins such as polyethylene and polypropylene, polyesters such as polyethylene terephthalate, polystyrene, polyvinyl chloride, and polycarbonate.

<Protective Layer>

The protective layer is preferably made of a general-purpose resin. Specific examples of the resin include polyolefins such as polyethylene and polypropylene, polyesters such as polyethylene terephthalate, polystyrene, polyvinyl chloride, and polycarbonate. The protective layer may be made of material identical to that of the supporting member. However, the protective layer is required to be transparent to such an extent that the color change of the temperature detection part disposed under the protective layer can be confirmed.

<Temperature Detection Part>

The temperature detection part includes a temperature detection material that in a heating process starts color development at a temperature $T_1$ and starts decoloring by being melted when a temperature $T_2$ is reached, and in a cooling process, solidifies while remaining decolored when cooled to a temperature T1 or lower.

(Temperature Detection Material)

The temperature detection material includes a temperature-indicating material that contains a leuco dye which is an electron donating compound, a developer which is an electron accepting compound, and a decolorant for controlling the temperature range of color change.

The temperature detection material may use the temperature-indicating material as it is, or may have a structure in which the temperature-indicating material is contained in microcapsules, or a phase separation structure in which the temperature-indicating material is protected by matrix material having no function of color developing or decoloring. The temperature detection material may be an ink or a paint produced by mixing the temperature-indicating material, which is a solid material, with a solvent.

The temperature-indicating material changes from a solid state to a liquid state or from a liquid state to a solid state, depending on the temperature thereof. In order to suppress the inhibition of the temperature detection function, it is preferable that the temperature-indicating material is separated from other materials. For example, as mentioned above, by causing the temperature-indicating material to be microencapsulated or to have the phase separation structure, the temperature-indicating material can be separated from other materials and further can be a material in the solid state regardless of its temperature. Alternatively, the temperature-indicating material may be contained in porous material, such as resin or glass.

(Temperature-Indicating Material)

The temperature-indicating material changes its color density depending on changes in the temperature thereof (temperature increase/temperature decrease), and thus exhibits the hysteresis characteristics in the color-density-to-temperature curve. The temperature-indicating material is a material that solidifies in an amorphous state without being crystalized when cooled from a melted state.

FIG. 1 shows a differential scanning calorimetry (DSC) curve of the temperature-indicating material according to an embodiment of the present invention. In the cooling process (indicated by the leftward arrow (←) in the figure), no exothermic peaks due to crystallization is observed because crystallization does not occur. On the other hand, in the heating process (indicated by the rightward arrow (→) in the figure), an exothermic peak (crystallization peak) due to crystallization is observed. $T_1$ is a start temperature in the heating process (crystallization start temperature in the heating process). $T_2$ is a melting point.

Figure 2:
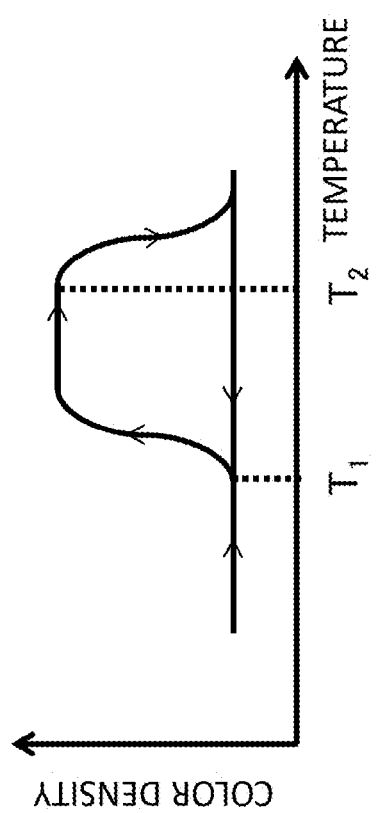
FIG. 2 is a diagram schematically showing the relationship between the temperature and the color density of the temperature-indicating material according to FIG. 1.

FIG. 2 is a diagram showing the relationship between the temperature and the color density of the temperature-indicating material according to FIG. 1. As the temperature of the temperature-indicating material increases, the temperature-indicating material starts color development by being crystallized at a temperature $T_1$. When the temperature of the temperature-indicating material continues to be increased and reaches the melting point $T_2$, the temperature-indicating material starts decoloring by being melted. When cooled in the decolored state, the temperature-indicating material is solidified in the amorphous state without being crystallized, and remains in the decolored state. Therefore, the temperature-indicating material can initialize the color change by having its temperature increased to the temperature $T_2$ or higher.

The starting temperature, at which the crystallization starts in the heating process, depends on the temperature increase rate or an elapse time. When the temperature of the temperature-indicating material is increased at a low speed, the start temperature of the crystallization appears at a low temperature, whereas when the temperature of the temperature-indicating material is increased at a high speed, the start temperature of the crystallization appears at a high temperature, or the temperature-indicating material melts at the melting point $T_2$ while the start temperature does not appear. Since the occurrence of crystallization causes color development, the start temperature is set in accordance with requirements for the detection temperature and the detection time. $T_g$ is the glass transition point. At a temperature lower than the glass transition point, the crystallization does not start. In the case of material that is more likely to be crystallized, it easily crystallizes at a temperature equal to or higher than the glass transition point. Thus, the start temperature and the glass transition point often become the same temperature.

(Leuco Dye)

The leuco dye is the electron donating compound. Dyes conventionally well-known as a dye for pressure-sensitive copying paper or a dye for thermal recording paper are usable. Examples of the leuco dye include triphenylmethane phthalide-based, fluoran-based, phenothiazine-based, indolyl phthalide-based, leuco auramine-based, spiropyran-based, rhodamine lactam-based, triphenylmethane-based, triazene-based, spirophthalan xanthene-based, naphtholactam-based, azomethine-based dyes, and the like. Specific examples of the leuco dye include 9-(N-ethyl-N-isopentylamino)spiro[benzo[a]xanthene-12,3'-phthalide], 2-methyl-6-(N-p-tolyl-N-ethylamino)-fluoran, 6-(diethylamino)-2-[(3-trifluoromethyl)anilino]xanthene-9-spiro-3'-phthalide, 3,3-bis(p-diethylaminophenyl)-6-dimethylaminophthalide, 2'-anilino-6'-(dibutylamino)-3'-methylspiro[phthalide-3,9'-xanthene], 3-(4-diethylamino-2-methylphenyl)-3-(1-ethyl-2-methylindol-3-yl)-4-azaphthalide, 1-ethyl-8-[N-ethyl-N-(4-methylphenyl)amino]-2,2,4-trimethyl-1,2-dihydrospiro[11H-chromeno[2,3-g]quinoline-11,3'-phthalide. The temperature-indicating material may use a combination of two or more kinds of the leuco dyes.

(Developer)

The developer changes the structure of the leuco dye in contact with the leuco dye having an electron donating property, thereby giving color. The well-known developers that are used for thermal recording paper, pressure-sensitive copying paper, and the like are usable as this developer. Specific examples of such a developer can include phenols, such as benzyl 4-hydroxybenzoate, 2,2'-biphenol, 1,1-bis(3-cyclohexyl-4-hydroxyphenyl)cyclohexane, 2,2-bis(3-cyclohexyl-4-hydroxyphenyl)propane, bisphenol bisphenol F, bis(4-hydroxyphenyl)sulfide, para-hydroxybenzoates, and gallic acid esters. The developer is not limited thereto and may be a compound which is an electron acceptor and can change the color of the leuco dye. Alternatively, metal salts of carboxylic acid derivatives, salicylic acid and salicylic acid metal salts, sulfonic acids, sulfonates, phosphoric acids, phosphoric acid metal salts, acidic phosphates, acidic phosphate metal salts, phosphorous acids, phosphorous acid metal salts, and the like may also be used. Particularly, the developer is preferably made of a compound which is highly compatible with the leuco dyes or decolorants described later, and examples thereof are preferably organic developers, such as benzyl 4-hydroxybenzoate, 2,2'-bisphenol, bisphenol A and gallic acid esters.

The temperature-indicating material may include one or a combination of two or more of these developers. By combining the developers, the color density of the leuco dye when giving color is adjustable. The amount of use of the developer is selected according to the desired color density. For example, the amount of use of the developer only needs to be normally selected within a range from about 0.1 to 100 parts by mass with respect to one part by mass of the above-mentioned leuco dye.

(Decolorant)

As the decolorant, materials capable of dissociating the bond between the leuco dye and the developer can be widely used. Various materials may serve as the decolorant as long as they have a low polarity and do not exhibit the color developing property for the leuco dye but have the polarity enough to dissolve the leuco dye and the developer.

Various organic compounds can be used as the decolorant. Typically, examples thereof include hydroxy compounds, ester compounds, peroxy compounds, carbonyl compounds, aromatic compounds, aliphatic compounds, halogen compounds, amino compounds, imino compounds, N-oxide compounds, hydroxyamine compounds, nitro compounds, azo compounds, diazo compounds, azide compounds, ether compounds, fat compounds, sugar compounds, peptide compounds, nucleic acid compounds, alkaloid compounds, steroid compounds, and the like. Specific examples of the decolorant include: ester compounds, such as tricaprin, isopropyl myristate, acetic acid, m-tolyl, diethyl sebacate, dimethyl adipate, 1,4-diacetoxybutane, decyl decanoate, diethyl phenylmalonate, diisobutyl phthalate, triethyl citrate, benzylbutyl phthalate, butyl phthalyl butyl glycolate, methyl N-methylanthranilate, ethyl anthranilate, 2-hydroxyethyl salicylate, methyl nicotinate, butyl 4-aminobenzoate, methyl p-toluate, ethyl 4-nitrobenzoate, 2-phenylethyl phenylacetate, benzyl cinnamate, methyl acetoacetate, geranyl acetate, dimethyl succinate, dimethyl sebacate, diethyl oxalacetate, monoolein, butyl palmitate, ethyl stearate, methyl palmitate, methyl stearate, linalyl acetate, di-n-octyl phthalate, benzyl benzoate, diethylene glycol dibenzoate, methyl p-anisate, m-tolyl acetate, cinnamyl cinnamate, 2-phenylethyl propionate, butyl stearate, ethyl myristate, methyl myristate, methyl anthranilate, nelyl acetate, isopropyl palmitate, ethyl 4-fluorobenzoate, cyclandelate (isomer mixtures), butopyronoxyl, ethyl 2-bromopropionate, tricaprylin, ethyl levulinate, hexadecyl palmitate, tert-butyl acetate, 1,1-ethanediol diacetate, dimethyl oxalate, tristearin, trimyristin, methyl acethylsalicylate, benzaldiacetate, methyl 2-benzoylbenzoate, ethyl 2,3-dibromobutyrate, ethyl 2-furacarboxylate, ethyl acetopyruvate, ethyl vanillate, dimethyl itaconate, methyl 3-bromobenzoate, monoethyl adipate, dimethyl adipate, 1,4-diacetoxybutane, diethylene glycol diacetate, ethyl palmitate, diethyl terephthalate, phenyl propionate, phenyl stearate, 1-naphthyl acetate, methyl behenate, methyl arachidinate, methyl 4-chlorobenzoate, methyl sorbate, ethyl isonicotinate, dimethyl dodecanedioate, methyl heptadecanate, ethyl α-cyanocinnamate, N-phenylglycine ethyl, diethyl itaconate, methyl picolinate, methyl isonicotinate, methyl DL-mandelate, methyl 3-aminobenzoate, methyl 4-methylsalicylate, diethyl benzylidenemalonate, isoamyl DL-mandelate, triethyl methanetricarboxylate, diethyl formaminomalonate, 1,2-bis(chloroacetoxy)ethane, methyl pentadecanoate, ethyl arachidinate, ethyl 6-bromohexanoate, monoethyl pimelate, hexadecyl lactate, ethyl benzylate, mefenpyr-diethyl, procaine, dicyclohexyl phthalate, 4-tert-butylphenyl salicylate, isobutyl 4-aminobenzoate, butyl 4-hydroxybenzoate, tripalmitin, 1,2-diacetoxybenzene, dimethyl isophthalate, monoethyl fumarate, methyl vanillate, methyl 3-amino-2-thiophenecarboxylate, ethomidate, cloquintocet-mexyl, methyl benzilate, diphenyl phthalate, phenyl benzoate, propyl 4-aminobenzoate, ethylene glycol dibenzoate, triacetin, ethyl pentafluoropropionate, methyl 3-nitrobenzoate, 4-nitrophenyl acetate, methyl 3-hydroxy-2-naphthoate, trimethyl citrate, ethyl 3-hydroxybenzoate, methyl 3-hydroxybenzoate, trimebutine, 4-methoxybenzyl acetate, pentaerythritol tetraacetate, methyl 4-bromobenzoate, ethyl 1-naphthaleneacetate, 5-nitro 2-furaldehyde diacetate, ethyl 4-aminobenzoate, propylparaben, 1,2,4-triacetoxybenzene, methyl 4-nitrobenzoate, diethyl acetamidomalonate, valetamate bromide, 2-naphthyl benzoate, dimethyl fumarate, adiphenine hydrochloride, benzyl 4-hydroxybenzoate, ethyl 4-hydroxybenzoate, vinyl butyrate, vitamin K4, methyl 4-iodobenzoate, methyl 3,3-dimethylacrylate, propyl gallate, 1,4-diacetoxybenzene, diethyl mesoxalate, dimethyl 1,4-cyclohexanedicarboxylate (cis- and trans-mixtures), triethyl 1,1,2-ethanetricarboxylate, dimethyl hexafluoroglutarate, amyl benzoate, ethyl 3-bromobenzoate, ethyl 5-bromo-2-chlorobenzoate, bis(2-ethylhexyl) phthalate, diethyl allylmalonate, diethyl bromomalonate, diethyl ethoxymethylenemalonate, diethyl ethylmalonate, diethyl fumarate, diethyl maleate, diethyl malonate, diethyl phthalate, dimethyl 1,3-acetonedicarboxylate, dimethyl phthalate, ethyl 3-aminobenzoate, ethyl benzoate, ethyl 4-(dimethylamino)benzoate, ethyl nicotinate, ethyl phenylpropionate, ethyl pyridine-2-carboxylate, ethyl 2-pyridylacetate, ethyl 3-pyridylacetate, methyl benzoate, ethyl phenylacetate, amyl 4-hydroxybenzoate, 2,5-diacetoxytoluene, ethyl 4-oxazolecarboxylate, trimethyl 1,3,5-cyclohexanetricarboxylate (cis- and trans-mixtures), methyl 3-(chlorosulfonyl)-2-thiophenecarboxylate, pentaerythritol distearate, benzyl laurate, diethyl acetylenedicarboxylate, phenyl methacrylate, benzyl acetate, dimethyl glutarate, ethyl 2-oxocyclohexanecarboxylate, ethyl phenylcyanoacetate, ethyl 1-piperazinecarboxylate, methyl benzoylformate, methyl phenylacetate, phenyl acetate, diethyl succinate, tributyrin, diethyl methylmalonate, dimethyl oxalate, diethyl 1,1-cyclopropanedicarboxylate, dibenzyl malonate, methyl 4-tert-butylbenzoate, ethyl 2-oxocyclopentanecarboxylate, methyl cyclohexanecarboxylate, ethyl 4-methoxyphenylacetate, methyl 4-fluorobenzoylacetate, dimethyl maleate, methyl terephthalaldehyde, ethyl 4-bromobenzoate, methyl 2-bromobenzoate, methyl 2-iodobenzoate, ethyl 3-iodobenzoate, ethyl 3-furancarboxylate, diallyl phthalate, benzyl bromoacetate, dimethyl bromomalonate, methyl m-toluate, diethyl 1,3-acetonedicarboxylate, methyl phenylpropiolate, 1-naphthyl butyrate, ethyl o-toluate, methyl 2-oxocyclopentanecarboxylate, isobutyl benzoate, ethyl 3-phenylpropionate, di-tert-butyl malonate, dibutyl sebacate, diethyl adipate, diethyl terephthalate, dipropyl phthalate, 1,1-ethanediol diacetate, diisopropyl adipate, diisopropyl fumarate, ethyl cinnamate, 2-ethylhexyl 2-cyano-3,3-diphenylacrylate, neopentyl glycol diacrylate, triolein, ethyl benzoylacetate, ethyl p-anisate, diethyl suberate, sorbitan tristearate, sorbitan monostearate, stearamide, glycerol monostearate, glycerol distearate, 3-(tert-butoxycarbonyl)phenylboronic acid, racecadotril, 4-[(6-acryloyloxy)hexyloxy]-4'-cyanobiphenyl, 2-(dimethylamino)vinyl 3-pyridyl ketone, stearyl acrylate, ethyl 4-bromophenylacetate, dibenzyl phthalate, methyl 3,5-dimethoxybenzoate, eugenol acetate, didodecyl 3,3'-thiodipropionate, vanillin acetate, diphenyl carbonate, ethyl oxanilate, methyl terephthalaldehydate, dimethyl 4-nitrophthalate, ethyl(4-nitrobenzoyl)acetate, dimethyl nitroterephthalate, methyl 2-methoxy-5-(methylsulfonyl)benzoate, methyl 3-methyl-4-nitrobenzoate, dimethyl 2,3-naphthalenedicarboxylate, bis (2-ethylhexyl) adipate, 4'-acetoxyacetophenone, ethyl trans-3-benzoylacrylate, ethyl coumarin-3-carboxylate, BAPTA tetraethyl ester, methyl 2,6-dimethoxybenzoate, di-tert-butyl iminodicarboxylate, benzyl p-benzyloxybenzoate, methyl 3,4,5-trimethoxybenzoate, methyl 3-amino-4-methoxybenzoate, diethylene glycol distearate, ditetradecyl 3,3'-thiodipropionate, ethyl 4-nitrophenylacetate, methyl 4-chloro-3-nitrobenzoate, 1,4-dipropionyloxybenzene, dimethyl terephthalate, ethyl 4-nitrocinnamate, dimethyl 5-nitroisophthalate, triethyl 1,3,5-benzenetricarboxylate, diethyl N-(4-aminobenzoyl)-L-glutamate, 2-methyl-1-naphthyl acetate, 7-acetoxy-4-methylcoumarin, methyl 4-amino-2-methoxybenzoate, 4,4'-diacetoxybiphenyl, dimethyl 5-aminoisophthalate, diethyl 1,4-dihydro-2,6-dimethyl-3,5-pyridinedicarboxylate, dimethyl 4,4'-biphenyldicarboxylate, 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, 4-benzyloxyphenylethyl octadecenoate, 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethy hexadecanoate, 1,1-diphenylmethyl heptadecanoate, and 1,1-diphenylmethyl octadecanoate; and steroidal compounds, such as cholesterol, cholesteryl bromide, β-estradiol, methyl androstenediol, pregnenolone, cholesterol benzoate, cholesterol acetate, cholesterol linoleate, cholesterol palmitate, cholesterol stearate, cholesterol n-octanoate, cholesterol oleate, 3-chlorocholestene, cholesterol trans-cinnamate, cholesterol decanoate, cholesterol hydrocinnamate, cholesterol laurate, cholesterol butyrate, cholesterol formate, cholesterol heptanoate, cholesterol hexanoate, cholesterol hydrogen succinate, cholesterol myristate, cholesterol propionate, cholesterol valerate, cholesterol hydrogen phthalate, cholesterol phenylacetate, cholesterol chloroformate, cholesterol 2,4-dichlorobenzoate, cholesterol pelargonate, cholesterol nonyl carbonate, cholesterol heptyl carbonate, cholesterol oleyl carbonate, cholesterol methyl carbonate, cholesterol ethyl carbonate, cholesterol isopropyl carbonate, cholesterol butyl carbonate, cholesterol isobutyl carbonate, cholesterol amyl carbonate, cholesterol n-octyl carbonate, cholesterol hexyl carbonate, allylestrenol, altrenogest, 9(10)-dehydronandrolone, estrone, ethynylestradiol, estriol, estradiol benzoate, β-estradiol 17-cypionate, β-estradiol 17-valerate, α-estradiol, β-estradiol 17-heptanoate, gestrinone, mestranol, 2-methoxy-β-estradiol, nandrolone, (−)-norgestrel, quinestrol, trenbolone, tibolone, stanolone, androsterone, abiraterone, abiraterone acetate, dehydroepiandrosterone, dehydroepiandrosterone acetate, ethisterone, epiandrosterone, 17β-hydroxy-17-methylandrosta-1,4-dien-3-one, methylandrostenediol, methyltestosterone, Δ9(11)-methyltestosterone, 1α-methylandrostan-17β-ol-3-one, 17α-methylandrostan-17β-ol-3-one, stanozolol, testosterone, testosterone propionate, altrenogest, 16-dehydropregnenolone acetate, 16,17-epoxypregnenolone acetate, 11α-hydroxyprogesterone, 17α-hydroxyprogesterone caproate, 17α-hydroxyprogesterone, pregnenolone acetate, 17α-hydroxyprogesterone acetate, megestrol acetate, medroxyprogesterone acetate, pregnenolone acetate, 5β-pregnane-3α, 20α-diol, budesonide, corticosterone, cortisone acetate, cortisone, cortexolone, deoxycorticosterone acetate, deflazacort, hydrocortisone acetate, hydrocortisone, hydrocortisone 17-butyrate, 6α-methylprednisolone, prednisolone, prednisone, prednisolone acetate, sodium deoxycholate, sodium cholate, methyl cholate, methyl hyodeoxycholate, cholesterol, cholesterol-5α,6α-epoxide, diosgenin, ergosterol, β-sitosterol, stigmasterol, β-sitosterol acetate, and the like. From the viewpoint of compatibility with the leuco dye and the developer, the decolorant preferably includes any one of these compounds. It is obvious that the decolorant is not limited to these compounds and may be any other material that enables dissociating the bond between the leuco dye and the developer.

The detection temperature of the temperature-indicating material depends on the state change temperature of the decolorant. Among the above-mentioned compounds, the decolorant is preferably a material that is difficult to crystallize. This is because the temperature-indicating material, which is capable of detecting the deviation from the upper limit management temperature by being formed in an amorphous state through quenching, needs to be amorphized near the glass transition point without being crystallized in the quenching process. Increasing the cooling rate makes it easier to form the amorphous state, but in consideration of the practical use, a material that is less likely to crystallize to the extent that it forms the amorphous state during the process of naturally cooling from the melted state is preferred. As this condition, the decolorant that forms an amorphous state when cooled from the melting point to the glass transition point at a rate of 1° C./min or more is preferable, and the decolant that forms an amorphous state when cooled from the melting point to the glass transition point at a rate of 20° C./min or more is more preferable.

One or a combination of two or more of these decolorants may be used. Combining the decolorants enables the adjustment of the solidification point and the melting point.

(Microencapsulation)

A microcapsule containing the above-mentioned temperature-indicating material will be described below.

Examples of a resin coating used for the microcapsule include, but not limited to: an urea resin coating composed of a polyvalent amine and a carbonyl compound; a melamine resin coating composed of a melamine-formalin prepolymer, a methylol melamine prepolymer, and/or a methylated melamine prepolymer; an urethane resin coating composed of a polyvalent isocyanate and a polyol compound; an amide resin coating composed of a polybasic acid chloride and a polyvalent amine; and a vinyl-based resin coating composed of any one of various kinds of monomers, such as vinyl acetate, styrene, a (meth)acrylic acid ester, acrylonitrile, and vinyl chloride. Further, the resin coating can also be subjected to an additional process, for example, a surface treatment performed on the surface of the formed resin coating to adjust its surface energy when producing ink or paint, thereby improving the stability of dispersion of the microcapsules.

From the viewpoint of device compatibility, storage stability, and the like, the diameter of the microcapsule is preferably in a range from 0.1 to 100 μm and more preferably from 0.1 to 10 μm.

Various well-known methods can be used for the microencapsulation. Examples of the method can include, but not limited to, an emulsion polymerization method, a suspension polymerization method, a coacervation method, an interfacial polymerization method, a spray drying method, and the like. The method may be a combination of two or more different ones of these methods.

By the microencapsulation, the environmental resistance of the composition of the temperature-indicating material against humidity and the like is improved, thus making it possible to achieve the storage stability and the stability of color change properties thereof. Moreover, by the microencapsulation, the influence on the leuco dye, the developer, and the decolorant given from other compounds such as resin agents and additives can be suppressed when the ink, the paint, or the like is prepared.

(Phase Separation Structure)

The phase separation structure is a structure in which a solid material is formed by dispersing the temperature-indicating material into a matrix material. By having the phase separation structure, the storage stability and the stability of color change properties can be achieved in a simple method. Moreover, by the phase separation structure, the influence on the leuco dye, the developer, and the decolorant given from other compounds such as resin agents and additives can be suppressed when the ink, the paint, or the like is prepared.

Figures 3A, 3B:
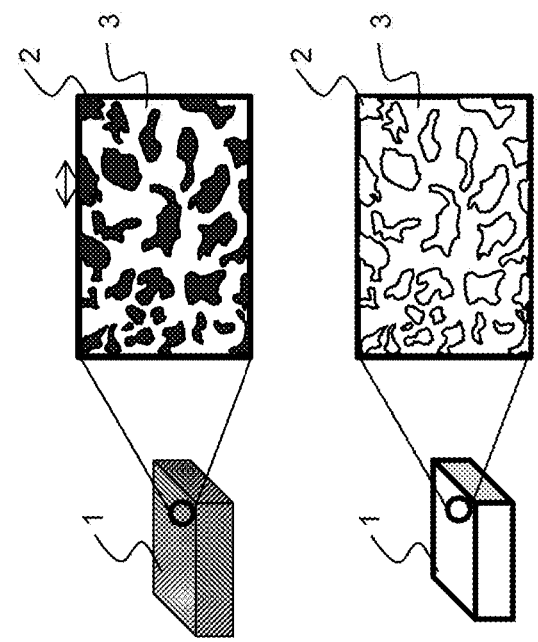
FIGS. 3A and 3B are schematic diagrams of a phase separation structure of a temperature detection material according to an embodiment of the present invention.
Figures 4A, 4B:
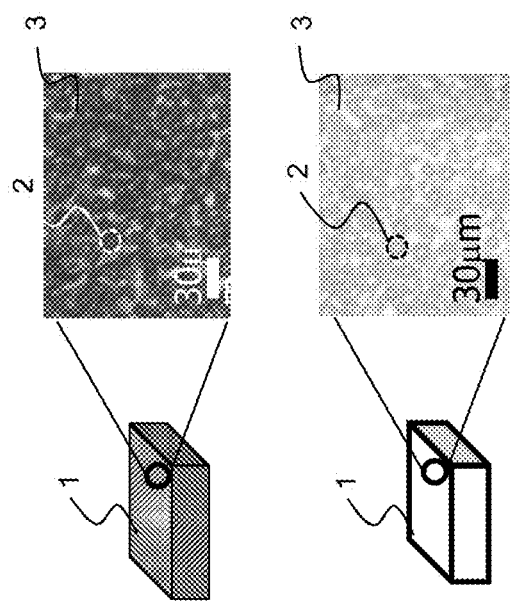
FIGS. 4A and 4B are optical micrographs of the temperature detection material according to the embodiment of the present invention.

FIG. 3 is a schematic diagram of the temperature detection material having the phase separation structure, and FIG. 4 is an optical micrograph of the temperature detection material having the phase separation structure. In FIGS. 3 and 4, (a) shows the colored state, and (b) shows the decolored state. FIG. 4 is a reflection image taken by an optical microscope using a halogen lamp as a light source. The temperature detection material 1 forms the phase separation structure in which the temperature-indicating material 2 is dispersed in the matrix material 3. That is, the phases containing the leuco dye, the developer, and the decolorant are dispersed in the matrix material to form this structure.

In the temperature detection material, the melting point of the matrix material is higher than the melting point of the temperature-indicating material, and thereby the temperature detection material remains in the solid state at the color change temperatures of the temperature-indicating material. Thus, the temperature detection material remains in the solid state even when the temperature-indicating material changes its state from solid to liquid or from liquid to solid to change its color therewith.

The matrix material and the temperature-indicating material are phase-separated and the matrix material does not affect the color change of the temperature-indicating material, which makes it possible to keep the temperature detecting function of the temperature-indicating material as it is.

The major axis of the phase made of the temperature-indicating material dispersed in the matrix material is preferably 100 nm or more and 1 mm or less, and more preferably 1 μm or more and 100 μm or less. The size of the phase made of the temperature-indicating material is not particularly limited, but when it is 100 nm or more, the influence on the detected temperature given by the interface between the temperature-indicating material and the matrix material can be suppressed. When the size of the phase made of the temperature-indicating material is set to 1 mm or less, it becomes difficult to visually distinguish between the temperature-indicating material and the matrix material, thus enabling suppression of color unevenness exhibited by the temperature detection material. The size of the phase made of the temperature-indicating material can be reduced by adding a surfactant or by cooling while stirring in a cooling step. The major axis of the phase made of the temperature-indicating material is the major axis of an approximate ellipse when the phase made of the temperature-indicating material is approximated to the ellipse.

The phase separation structure can also be pulverized by being crushed with a mortar or the like. This allows the same handling as the microcapsule.

The matrix material needs to be a material that does not impair the color developing property and the decoloring property of the temperature-indicating material when mixed with the temperature-indicating material. Thus, the matrix material itself is preferably a material that does not exhibit the color developing property. Such a material is, for example, a non-polar material which is not an electron acceptor.

To form the phase separation structure in which the temperature-indicating material is dispersed in the matrix material, the matrix material is required to be in the solid state at the use temperature of the temperature detection material, to have a melting point higher than the melting point of the temperature-indicating material, and to be a material having low compatibility with the leuco dye, the decolorant, and the developer.

Since the matrix material is solid at the use temperature of the temperature detection material and the melting point of the matrix material is higher than the melting point of the temperature-indicating material, the temperature detection material can remain in the solid state even when the temperature-indicating material changes its state from solid to liquid or from liquid to solid. In addition, since the matrix material is the material that has low compatibility with the leuco dye, the decolorant, and the developer, the temperature detection function of the temperature-indicating material can be maintained.

As the matrix material satisfying the above conditions, a material in which each of an energy δp due to the dipole interaction between molecules and the energy δh due to the hydrogen bonding between molecules, estimated as the Hansen solubility parameters, is 3 or less can be preferably used. Specifically, this matrix material is a material that has no polar group, or a material that is composed only of hydrocarbons. Further, examples thereof include: paraffin-based, microcrystalline-based, olefin-based, polypropylene-based, polyethylene-based waxes and the like; low molecular weight materials and high molecular weight materials that have many skeletons, such as propylene, ethylene, styrene, cycloolefin, siloxane, and terpene; and copolymers thereof.

Among these, a material that becomes a melt that has low viscosity at a temperature equal to or higher than the melting point and is easily solidified at a temperature lower than the melting point is preferable because of its good handleability. Alternatively, a material that is dissolved in an organic solvent and is solidified in a process of volatilizing the organic solvent also has good handleability. As the matrix material, paraffin wax, microcrystalline wax, polyolefin, terpene resin, and the like are particularly preferable. Examples of the polyolefin include low molecular weight polyethylene and low molecular weight polypropylene. The molecular weight and the viscosity in the liquid state of the polyolefin are not particularly limited, but the polyolefin which has the low viscosity in the liquid state has good formability because the amount of bubbles contained therein is small. Specifically, preferably, the molecular weight of the polyolefin is 50,000 or less, and the viscosity thereof at a temperature around the melting point is 10 Pa·S or less. More preferably, the molecular weight of the polyolefin is 10,000 or less, and the viscosity thereof at a temperature around the melting point is 1 Pa·S or less.

These matrix materials can also be used in combination.

Even the matrix material which is in the liquid state at the use temperature can be used as the temperature detection material as long as it demonstrates the phase separation structure with the temperature-indicating material and a solvent of a temperature detection ink. When the matrix material is a liquid with high viscosity, it is excellent in the handleability, as in the matrix material in the solid state. However, even if the matrix material is a liquid with the high viscosity, the precipitation of the temperature-indicating material in the matrix material is inevitable for the long-term use, and eventually the temperature detection material may be separated into two phases. Thus, the long-term stability of the temperature detection material is low.

The concentration of the temperature-indicating material contained in the matrix material is not particularly limited. However, 0.1 parts by mass or more and 100 parts by mass or less of the matrix material is preferably contained with respect to one part by mass of the temperature-indicating material. When the concentration of the matrix material with respect to one part by mass of the temperature-indicating material is 100 parts by mass or less, the degradation in the visibility as the temperature detection material can be suppressed. The formation of a structure in which the matrix material and the temperature-indicating material are continuous to each other (hereinafter referred to as a co-continuous structure) can be suppressed by setting the concentration of the matrix material to be equal to or higher than the concentration of the temperature-indicating material. Even in the co-continuous structure, the function of the temperature detection material is not impaired because the matrix material and the temperature-indicating material are phase-separated. However, the liquid of the temperature-indicating material may leak from the matrix material, thus degrading the long-term stability. Therefore, the matrix material content is more preferable in a range of about 1 to about 10 parts by mass with respect to one part by mass of the temperature-indicating material.

The phase separation structure and the microcapsule may be subjected to the surface treatment, such as silane coupling treatment, surface grafting, or corona treatment, to stabilize the dispersion for the ink, to improve the resistance to the solvent, and to improve the environment resistance to the light or the humidity, or the like. In addition, the phase separation structure and the microcapsule can also be covered with a further matrix material or microcapsule.

The phase separation structure can be produced, for example, by the following method. The leuco dye, the developer, the decolorant, and the matrix material are heated to a temperature that is equal to or higher than the melting point of the matrix material and mixed together. Then, the obtained mixture is cooled to a temperature that is equal to or lower than the solidification point of the matrix material. During the cooling process, the matrix material and the temperature-indicating material are quickly phase-separated, resulting in the formation of the phase separation structure in which the phases composed of the leuco dye, the developer, and the decolorant are dispersed in the matrix material.

When the matrix material is heated to a temperature equal to or higher than its melting point to be brought into a liquid state, the temperature-indicating material and the matrix material may or may not be compatible with each other, depending on the compatibility between the temperature-indicating material and the matrix material. At this time, the temperature-indicating material and the matrix material which are compatible well are preferred in terms of the handleability. The temperature-indicating material and the matrix material need to be phase-separated at the use temperature where the matrix material is in the solid state, but does not need to be phase-separated in the heated state where the matrix material is in the liquid state. The polarity of the used decolorant may be adjusted in order to phase-separate the temperature-indicating material and the matrix material from each other at the use temperature and to make the temperature-indicating material and the matrix material compatible with each other in the heated state. When the polarity of the decolorant is extremely small, the matrix material and the temperature-indicating material are compatible with each other at the use temperature of the temperature detection material. On the other hand, when the polarity of the decolorant is extremely large, the temperature-indicating material is separated from the matrix material in the heated state. Specifically, the material in which each of the energy $\delta p$ due to the dipole interaction between molecules and the energy $\delta h$ due to the hydrogen bonding between molecules, estimated as the Hansen solubility parameters, is 1 or more and 10 or less can be preferably used. It is noted that in the case where the polarity of the decolorant is large and the temperature-indicating material and the matrix material are not compatible with each other even in the heated state, the phase separation structure can be formed by cooling the temperature-indicating material and the matrix material while stirring them. Alternatively, the addition of the surfactant may make the temperature-indicating material and the matrix material compatible with each other.

When the phase separation structure is formed by cooling the matrix material and the temperature-indicating material to a temperature equal to or lower than the solidification point of the matrix material, the size of the dispersion structure of the temperature-indicating material varies depending on the compatibility between the temperature-indicating material and the matrix material. In particular, if the compatibility between the matrix material and the decolorant the content of which is large is good, the temperature-indicating material is dispersed finely, whereas if the compatibility therebetween is bad, the temperature-indicating material is dispersed significantly.

(Ink•Paint)

A temperature detection ink can be manufactured by producing the temperature detection material and mixing it with a solvent. The temperature detection ink can be applied to inks for pens, stamps, crayons, and inkjet printers, and paints for printing.

The temperature detection ink exhibits the form in which the temperature detection material is dispersed in the solvent. For this reason, the solvent that has low compatibility with the matrix material including the temperature-indicating material or the microcapsule needs to be used.

When the phase separation structure using the matrix material is used as the temperature detection material, a solvent having a high polarity is preferably used as the above solvent. As the solvent having high polarity, water, or alcohol, such as glycerin, methanol, ethanol, or propanol can be preferably used. Alternatively, ketones such as acetone, methyl ethyl ketone, and cyclohexanone, esters such as ethyl acetate, methyl acetate, ethyl propionate, and methyl propionate, ethers such as dimethyl ether and tetrahydrofuran, and the like can be used.

When the microencapsulated temperature detection material is used, a solvent to which the material of the microcapsule has resistance is preferably used. When a material having high polarity is used as the material of the microcapsule, an organic solvent having low polarity is preferably used. Specifically, non-polar solvents such as hexane, benzene, and toluene, and oils such as petroleum oil, mineral oil, and silicone oil are particularly preferable. Alternatively, other examples thereof include: ketones such as acetone, methyl ethyl ketone, and cyclohexanone; esters such as ethyl acetate, methyl acetate, ethyl propionate, and methyl propionate; and ethers such as dimethyl ether and tetrahydrofuran.

When a material having low polarity is used as the material of the microcapsule, the solvent having higher polarity is preferably used. Specifically, water, or alcohols, such as glycerin, methanol, ethanol, or propanol, can be preferably used. Alternatively, ketones such as acetone, methyl ethyl ketone, and cyclohexanone, esters such as ethyl acetate, methyl acetate, ethyl propionate, and methyl propionate, ethers such as dimethyl ether, tetrahydrofuran, and the like can be used.

These temperature detection inks have the temperature and time detection functions even in the liquid state. Further, by printing, writing, imprinting, or the like on a printing target or the like, the solvent of the ink is volatilized, allowing only the temperature detection material to constitute a printed matter. This printed matter can be used as an indicator of the temperature and time detection.

An additive may be further added to the solution of the temperature detection ink, such as an organic solvent or water, to the extent that it does not affect the temperature and time detection functions. For example, by containing a pigment, the color at the time of decoloring or color development can be changed.

Various additives and solvents are usable in the temperature detection ink. The viscosity of the temperature detection ink can also be adjusted by changing the amount of temperature detection material and/or additive. Thus, the temperature detection ink can be applied as inks for various printers, such as printers for offset printing, gravure printing, and flexographic printing, label printers, and thermal printers.

(Ink for Inkjet)

The temperature detection material can also be applied to an ink for a charge control type inkjet.

The ink for the charge control type inkjet printer contains the temperature detection material, a volatile organic solvent, a resin, and a conductive agent.

When the resistance of an ink solution is high, ink particles tend to fly with their path curved, without flying straight in a discharge portion for the ink in the charge control type inkjet printer. Thus, the resistance of the ink solution needs to be approximately 2000 Ωcm or less.

Since a resin, a pigment, and an organic solvent contained in the ink (especially, 2-butanone or ethanol, which is commonly used as an organic solvent in an ink for inkjet printers) have low conductivity, the resistance of the ink solution may become high, for example, in a range from 5000 to about several tens of thousands of Ωcm. The ink solution with high resistance makes it difficult to perform desired printing in the charge control type inkjet printer. For this reason, to reduce the resistance of the ink solution, a conductive agent needs to be added to the ink.

As the conductive agent, a complex is preferably used. The conductive agent needs to be dissolved in the solvent used. Further, it is important for the conductive agent not to affect the color tone. In general, a conductive agent having a salt structure is used. This is considered to be because this conductive agent has unbalanced charges in molecules and thus can exhibit high conductivity. Specifically, a cation of the conductive agent suitably has a tetraalkylammonium ion structure. The alkyl chain may be either a straight chain or a branched chain, and as the carbon number increases, the solubility of the conductive agent in the solvent is improved. The carbon number of the alkyl chain is preferably in a range from 2 to 8. As an anion of the conductive agent, a hexafluorophosphate ion, a tetrafluoroborate ion, or the like is preferable because of its high solubility in the solvent.

Specific examples of the conductive agent suitable for use include tetraethylammonium hexafluorophosphate, tetrapropylammonium hexafluorophosphate, tetrabutylammonium hexafluorophosphate, tetrapentylammonium hexafluorophosphate, tetrahexylammonium hexafluorophosphate, tetraoctylammonium hexafluorophosphate, tetraethylammonium tetrafluoroborate, tetrapropylammonium tetrafluoroborate, tetrabutylammonium tetrafluoroborate, tetrapentylammonium tetrafluoroborate, tetrahexylammonium tetrafluoroborate, tetraoctylammonium tetrafluoroborate, and the like.

<Fraud Detection Member>

The fraud detection member is a member whose appearance changes at a temperature equal to or higher than the color development start temperature $T_1$ of the temperature-indicating material and equal to or lower than the decoloring start temperature $T_2$ of the temperature-indicating material. Alternatively, the fraud detection member is a high-melting-point material that has a melting point or glass transition point higher than $T_2$. The change of the appearance is, for example, color change, a change in transparency, a change in shape, or the like.

In the present embodiment, a description will be given on the temperature detection label including a member that changes its color at a temperature equal to or higher than $T_1$ and equal to or lower than $T_2$. FIGS. 5 to 8 are schematic diagrams of the temperature detection label according to the first embodiment. In FIGS. 5 to 8, (a) is a cross-sectional view of the temperature detection label, and (b) is a top view of the temperature detection label.

Figures 5A, 5B:
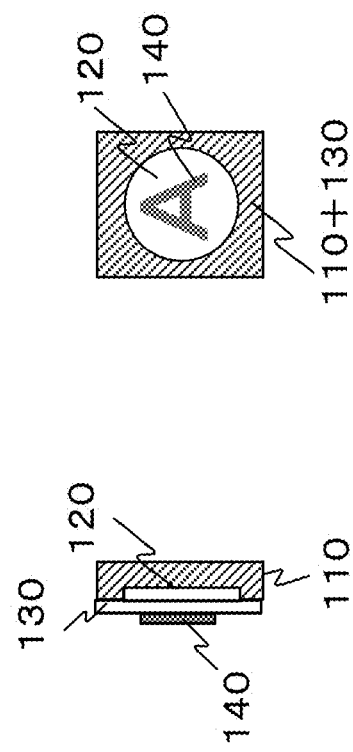
FIGS. 5A and 5B are schematic diagrams of a temperature detection label according to a first embodiment.

FIG. 5 shows the temperature detection label at a temperature lower than the color development start temperature $T_1$ of the temperature-indicating material. The temperature detection label includes a supporting member 110, a temperature detection part made of a temperature detection material 120, and a protective layer 130 provided to cover the temperature detection part. On the surface of the protective layer 130, a thermo-sensitive sheet 140 that irreversibly changes its color at a temperature equal to or higher than $T_1$ and equal to or lower than $T_2$ is provided as the fraud detection member. The supporting member 110 and the protective layer 130 are bonded together with the temperature detection material kept sealed. At a temperature lower than the temperature $T_1$, the temperature detection material is in the decolored, solid state. If the thermo-sensitive sheet is transparent to the extent that the temperature detection material located under the thermo-sensitive sheet is visible, the thermo-sensitive sheet may cover a part or all of the entire temperature detection part.

Figures 6A, 6B:
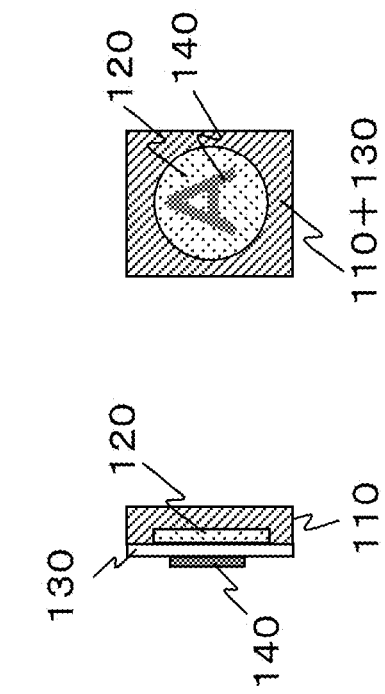
FIGS. 6A and 6B are schematic diagrams of the temperature detection label according to the first embodiment.

FIG. 6 shows the temperature detection label at a temperature equal to or higher than the color development start temperature $T_1$ of the temperature-indicating material and lower than a color change temperature of the thermo-sensitive sheet. At this time, the temperature detection material is in the colored state. Meanwhile, the color of the thermo-sensitive sheet does not change.

Figures 7A, 7B:
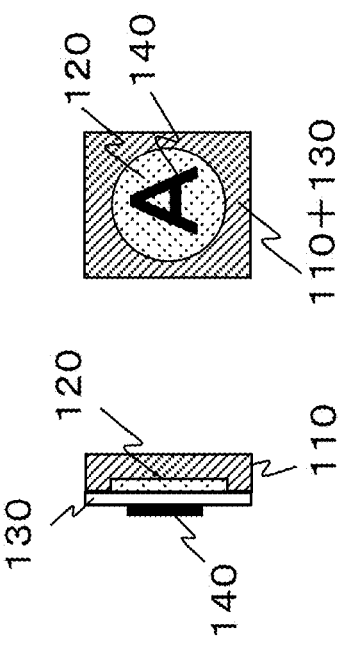
FIGS. 7A and 7B are schematic diagrams of the temperature detection label according to the first embodiment.

FIG. 7 shows the temperature detection label at a temperature equal to or higher than the color development start temperature $T_1$ of the temperature-indicating material, lower than the decoloring start temperature of the temperature-indicating material, and equal to or higher than the color change temperature of the thermo-sensitive sheet. At this time, the temperature detection material remains in the colored state, and the thermo-sensitive sheet also changes its color. When the color change temperature of the thermo-sensitive sheet is $T_1$, the temperature detection label changes from the state of FIG. 5 to the state of FIG. 7 without passing through the state of FIG. 6.

Figures 8A, 8B:
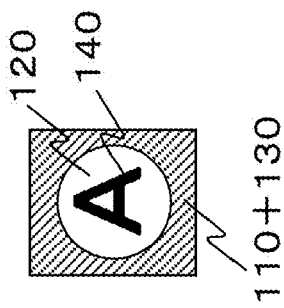
FIGS. 8A and 8B are schematic diagrams of the temperature detection label according to the first embodiment.

FIG. 8 shows the temperature detection label at a temperature equal to or higher than the decoloring start temperature $T_2$ of the temperature-indicating material. At this time, the temperature detection material is in the decolored, liquid state. This is because the temperature detection material changes from the colored state to the decolored state when its temperature is equal to or higher than $T_2$. Meanwhile, the thermo-sensitive sheet remains in the color-changed state. The color of the thermo-sensitive sheet is not returned to the original color even when its temperature is returned to a temperature lower than the color development start temperature $T_1$ of the temperature-indicating material through the state of FIG. 8 because the color change of the thermo-sensitive sheet is irreversible. The temperature detection material remains decolored, but changes its state from liquid to solid.

As mentioned above, the temperature deviation from the management temperature can be confined when the thermo-sensitive sheet changes its color even though the temperature detection material is in the decolored state. Therefore, the fraud that intends to return the temperature detection material to the initial state can be suppressed. Furthermore, even if the temperature detection material is returned to the initial state due to fraud, the presence or absence of the fraud can be confirmed.

<Thermo-Sensitive Sheet>

The thermo-sensitive sheet may be one that irreversibly changes its color at a temperature equal to or higher than $T_1$ and equal to or lower than $T_2$. Specifically, a thermal paper or thermo-sensitive sheet using the leuco dye and the developer is usable. The thermo-sensitive sheet is preferably transparent to the extent that the temperature detection material under the thermo-sensitive sheet is visible. When the thermo-sensitive sheet is transparent to the extent that the temperature detection material thereunder is visible, the thermo-sensitive sheet may cover all the temperature detection part.

Second Embodiment

In a second embodiment below, a description of the same configuration as that in the first embodiment will be omitted. The temperature detection label according to the second embodiment uses, as the fraud detection member, a heat-shrinkable film that irreversibly shrinks at a temperature equal to or higher than $T_1$ and equal to or lower than $T_2$. FIGS. 9 to 12 show schematic diagrams of the temperature detection label according to the second embodiment. In FIGS. 9 to 12, (a) is a cross-sectional view of the temperature detection label, and (b) is a top view of the temperature detection label.

FIG. 9 shows the temperature detection label at a temperature lower than the color development start temperature $T_1$ of the temperature-indicating material. This embodiment has the same configuration as the first embodiment except for the use of the heat-shrinkable film 210 that irreversibly shrinks at a temperature equal to or higher than $T_1$ and equal to or lower than $T_2$, as the fraud detection member. The heat-shrinkable film is provided on the surface of the protective layer. At a temperature lower than $T_1$, the temperature detection material is in the decolored, solid state, while the heat-shrinkable film is not in a shrinking state.

FIG. 10 shows the temperature detection label at a temperature equal to or higher than $T_1$ and lower than a heat shrink temperature of the heat-shrinkable film. The temperature detection material changes from the decolored state to the colored state, but the state or shape of the heat-shrinkable film does not change.

Figures 11A, 11B:
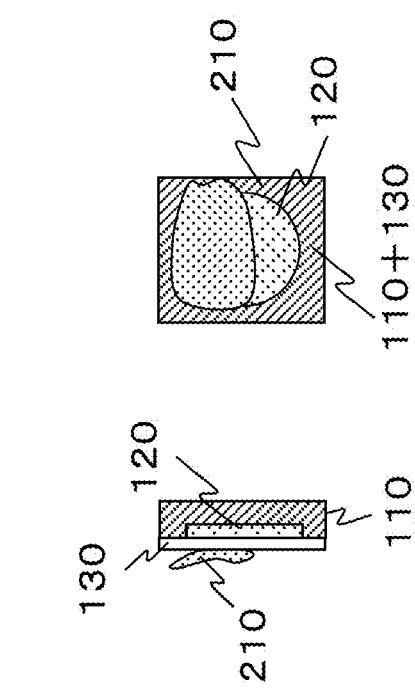
FIGS. 11A and 11B are schematic diagrams of the temperature detection label according to the second embodiment.

FIG. 11 shows the temperature detection label at a temperature equal to or higher than $T_1$ and lower than $T_2$, and equal to or higher than the heat shrink temperature of the heat-shrinkable film. At this time, the temperature detection material is in the colored state. Meanwhile, the heat-shrinkable film is in a shrinking state due to the heat. When the heat shrink temperature of the heat-shrinkable film is $T_1$, the temperature detection label changes from the state of FIG. 9 to the state of FIG. 11 without passing through the state of FIG. 10.

Figures 12A, 12B:
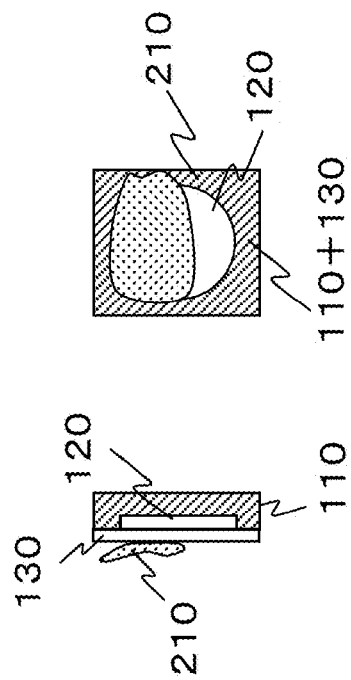
FIGS. 12A and 12B are schematic diagrams of the temperature detection label according to the second embodiment.

FIG. 12 shows the temperature detection label at a temperature equal to or higher than $T_2$. At this time, the temperature detection material is in the decolored, liquid state. Meanwhile, the heat-shrinkable film remains in the shrinking state. If the temperature detection label is placed in a temperature environment at a temperature equal to or higher than $T_2$ and then returned to a temperature lower than $T_1$, the shrinking state of the heat-shrinkable film is not returned to an original state because the change of the heat-shrinkable film is irreversible. At this time, the temperature detection material remains decolored, but changes its state from liquid to solid.

As mentioned above, the temperature deviation from the management temperature can be confirmed when the thermo-sensitive sheet is in the shrinking state even if the temperature detection material is in the decolored state.

<Heat-Shrinkable Film>

The film may be one that irreversibly shrinks at a temperature equal to or higher than $T_1$ and equal to or lower than $T_2$. The film can use a material having a melting point or glass transition point which is equal to or higher than $T_1$ and equal to or lower than $T_2$. Specifically, a heat-shrinkable film made of a polyolefin-based material, such as polyethylene, or polyvinyl chloride can be exemplified.

The film is preferably transparent to the extent that the temperature detection material under the film is visible. When the film is transparent to the extent that the temperature detection material under the film is visible, the film may cover all the temperature detection part. The second embodiment uses the heat-shrinkable film, but can use a material whose appearance irreversibly changes due to heat.

Third Embodiment

Figures 14A, 14B:
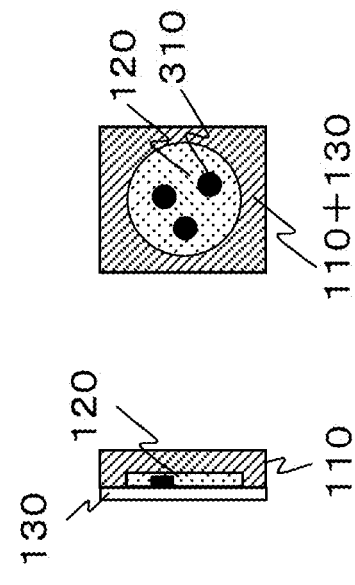
FIGS. 14A and 14B are schematic diagrams of the temperature detection label according to the third embodiment.
Figures 13A, 13B:
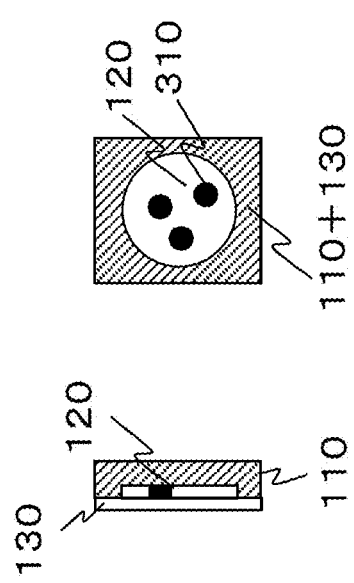
FIGS. 13A and 13B are schematic diagrams of a temperature detection label according to a third embodiment.

A temperature detection label according to a third embodiment uses, as the fraud detection member, a material having a melting point or glass transition point higher than $T_2$ (hereinafter referred to as a high-melting-point material). FIGS. 13 to 15 show schematic diagrams of the temperature detection label according to the third embodiment. In FIGS. 13 to 15, (a) is a cross-sectional view of the temperature detection label, and (b) is a top view of the temperature detection label.

FIG. 13 shows the temperature detection label at a temperature lower than the color development start temperature $T_1$ of the temperature-indicating material. This embodiment has the same configuration as the first embodiment except for the use of a high-melting-point material 310 as the fraud detection member. The high-melting-point material is disposed in the temperature detection part and mixed into the temperature detection material. At a temperature lower than $T_1$, the temperature detection material is in the decolored, solid state, while the high-melting-point material is dispersed in the temperature detection material.

FIG. 14 shows the temperature detection label at a temperature equal to or higher than $T_1$ and lower than $T_2$. At this time, the temperature detection material changes from the decolored state to the colored state. The locations of the high-melting-point material remain in the state shown in FIG. 13.

FIG. 15 shows the temperature detection label at a temperature equal to or higher than $T_2$ and lower than the melting point or glass transition point of the high-melting-point material. At this time, the temperature detection material is brought into the decolored, liquid state. As the temperature detection material is brought into the liquid state, the high-melting-point material can move inside the temperature detection material, causing the locations of the high-melting-point material to change.

Even when the temperature detection label is placed in the temperature environment equal to or higher than $T_2$ and then returned to a temperature lower than $T_1$, the locations of the high-melting-point material change. Therefore, the presence or absence of the temperature deviation from the management temperature can be confirmed from the positions of the high-melting-point material before and after the use thereof, even if the temperature detection material is in the decolored state.

<High-Melting-Point Material>

The team high-melting-point material as used in this specification refers to a material that has a melting point or glass transition point higher than the decoloring start temperature $T_2$ of the temperature detection material. The high-melting-point material 310 may be any material that continuously remain in the solid state even at a temperature higher than the decoloring start temperature $T_2$ of the temperature-indicating material, regardless of natural or artificial materials. In consideration of the heat resistance of the supporting member 110 and the protective layer 130 which are made of a general-purpose resin, the decoloring start temperature $T_2$ of the temperature-indicating material is preferably equal to or lower than 150° C. Therefore, the high-melting-point material preferably has a heat resistance of at least 150° C. or higher. Specific examples of the high-melting-point material include: inorganic oxides, such as $SiO_2$, $Al_2O_3$, $Fe_2O_3$, MgO, CaO, and $Na_2O$; fluorine-substituted polymers, such as polypropylene, polyethylene terephthalate, polyvinyl chloride, and Teflon (registered trademark); high melting point polymers, such as polystyrene and nylon; inorganic salts, such as potassium chloride, sodium chloride, potassium nitrate, and potassium sulfate; carbon compounds, such as graphite and carbon fiber; pure metals such as aluminum, iron, nickel and titanium, and alloys thereof; and industrial minerals, such as sand and gravel. These materials can also be used in combination.

Fourth Embodiment

Figures 17A, 17B:
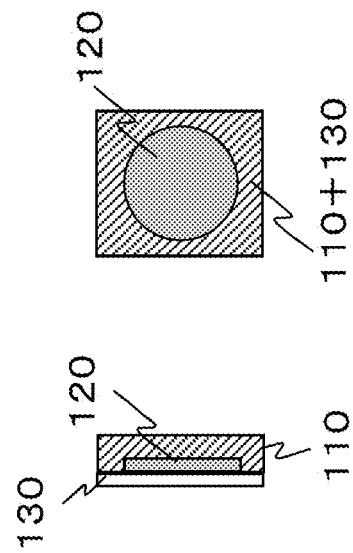
FIGS. 17A and 17B are schematic diagrams of the temperature detection label according to the fourth embodiment.
Figures 16A, 16B:
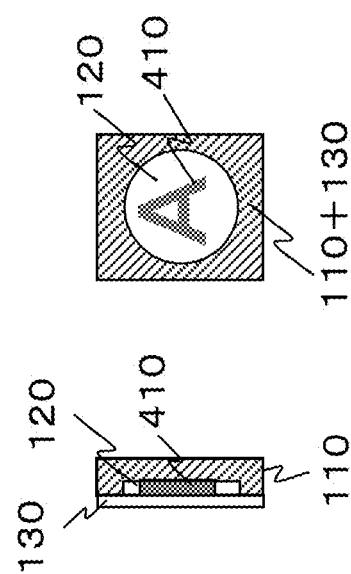
FIGS. 16A and 16B are schematic diagrams of a temperature detection label according to a fourth embodiment.

The temperature detection label according to a fourth embodiment uses, as the fraud detection member, a material identical to the temperature detection material used in the temperature detection part. FIGS. 16 to 18 show schematic diagrams of the temperature detection label according to the fourth embodiment. In FIGS. 16 to 18, (a) is a cross-sectional view of the temperature detection label, and (b) is a top view of the temperature detection label.

FIG. 16 shows the temperature detection label at a temperature lower than the color development start temperature $T_1$ of the temperature-indicating material. The temperature detection part has a first region 120 made of the temperature detection material and a second region 410 made of the temperature detection material identical to that in the first region. At a temperature lower than $T_1$, the first region 120 is in the decolored, solid state, whereas the second region 410 is in the colored, solid state. The temperature detection material is placed in the temperature environment at a temperature equal to or higher than $T_1$ and lower than $T_2$, and then cooled to a temperature lower than $T_1$ in the colored state, so that the temperature detection material can be eventually in the colored state even at a temperature lower than $T_1$.

FIG. 17 shows the temperature detection label at a temperature equal to or higher than $T_1$ and lower than $T_2$. The temperature detection material in the first region is also brought into the colored state, so that the temperature detection materials in both the first and second regions are in the colored state.

FIG. 18 shows the temperature detection label at a temperature equal to or higher than $T_2$. Both of the temperature detection material in the first region and the temperature detection material in the second region are brought into the decolored liquid state. When the temperature of the temperature detection material is returned from this state (the state in which the temperature detection label is placed in the temperature environment at a temperature equal to or higher than $T_2$) to a temperature lower than $T_1$, the temperature detection materials in both the first and second regions are decolored and changed into the solid.

As mentioned above, once the temperature detection label is placed in the temperature environment at a temperature equal to or higher than $T_2$, the temperature detection label cannot be returned to the initial state where the colors in the first and second regions are different. Thus, when there occurs the deviation from the management temperature, the fraud that initializes the temperature detection material can be suppressed.

Fifth Embodiment

Figures 20A, 20B:
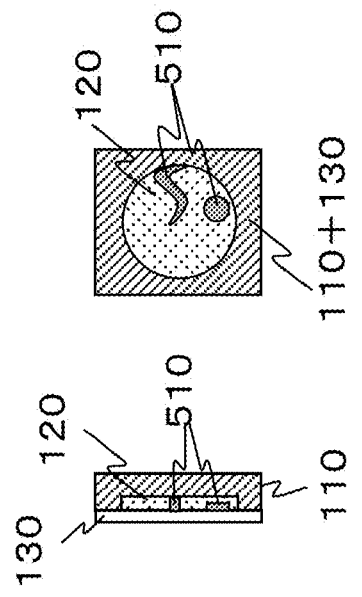
FIGS. 20A and 20B are schematic diagrams of the temperature detection label according to the fifth embodiment.
Figures 19A, 19B:
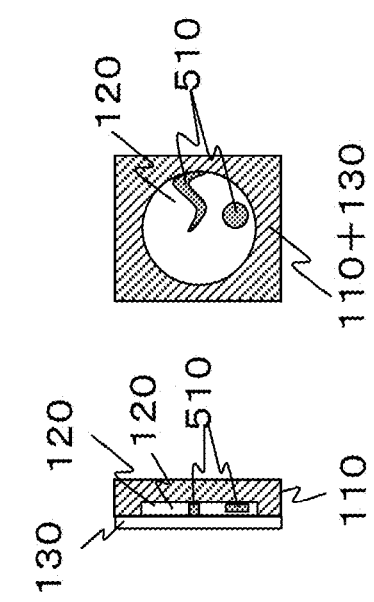
FIGS. 19A and 19B are schematic diagrams of a temperature detection label according to a fifth embodiment.

A temperature detection label according to a fifth embodiment uses, as the fraud detection member, voids generated in the temperature detection material. FIGS. 19 to 21 show schematic diagrams of the temperature detection label according to the fifth embodiment. In FIGS. 19 to 21, (a) is a cross-sectional view of the temperature detection label, and (b) is a top view of the temperature detection label.

FIG. 19 shows the temperature detection label at a temperature lower than the color development start temperature $T_1$ of the temperature-indicating material. This embodiment has the same configuration as the first embodiment except for the use of voids generated in the temperature detection material as the fraud detection member. At a temperature lower than $T_1$, the temperature detection material is in the discolored, solid state where voids 510 are present at any positions of the temperature detection material.

FIG. 20 shows the temperature detection label at a temperature equal to or higher than $T_1$ and lower than $T_2$. At this time, the temperature detection material changes from the decolored state to the colored state. The number and positions of the voids do not change and remain in the state of FIG. 13.

FIG. 21 shows the temperature detection label at a temperature equal to or higher than $T_2$ and lower than the melting point or glass transition point of the high-melting-point material. At this time, the temperature detection material is brought into the decolored, liquid state. As the temperature detection material is brought into the liquid state, the voids present in the temperature detection material disappear or change their positions.

Therefore, even when the temperature detection label is placed in the temperature environment equal to or higher than $T_2$ and then returned to a temperature lower than $T_1$, the form (number, position, shape, or the like) of the voids changes. Therefore, the presence or absence of the temperature deviation from the management temperature can be confirmed from the form of the voids before and after the use, even if the temperature detection material is in the decolored state.

<Voids>

The voids 510 are air bubbles, cracks, and the like. The shape of the void is not particularly limited. The size of the void depends on the resolution of a device for determining the state of the temperature detection material and part. However, when considering the application to a simple device, such as a smartphone, the size of the void is preferably equal to or more than a millimeter.

Sixth Embodiment

Hereinafter, a fraud detection method and an article management device when using the temperature detection labels according to the above-mentioned embodiments will be described with reference to FIGS. 22 to 24.

<Fraud Detection Method and Management Device>

Figure 22:
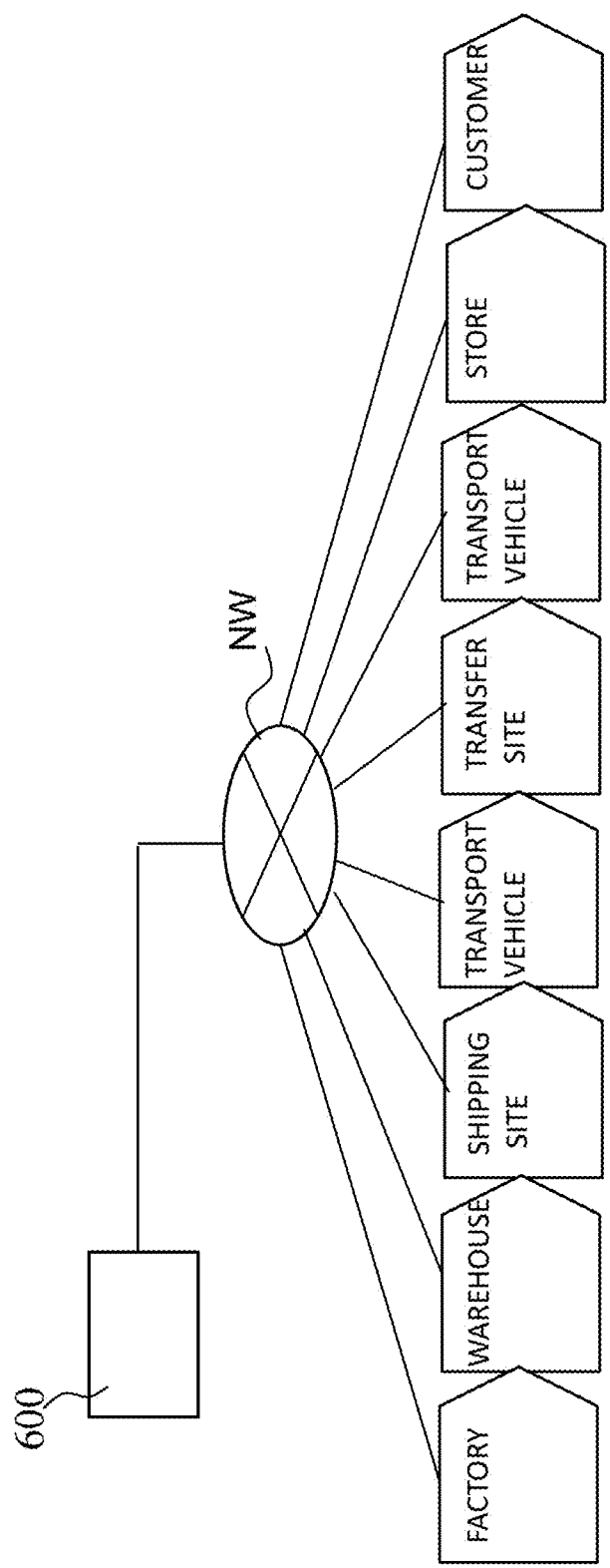
FIG. 22 is a configuration diagram of an article management system.

FIG. 22 is a configuration diagram of an article management system using the temperature detection label according to any one of the first to fifth embodiments. An article is transported from a factory to a store. For example, the article is transported by a transport vehicle from the factory via a warehouse and a shipping site. The article transported by the transport vehicle is transferred and loaded to another transport vehicle at a transit point, such as a transfer site, and delivered to the store. The temperature detection label is affixed to articles, such as goods or their packaging. An image of the temperature detection label is acquired at least at the factory before shipment and at the store which is the final location of transportation. When a location where the temperature deviation occurs is intended to be specified, images of the temperature detection label may be taken at respective locations, such as the warehouse, the shipping site, the transport vehicle, the transfer site, and the store. The taken images are stored in a management device 600 from an image pickup device, a terminal installed at each location, or the like through a network line.

Figure 23:
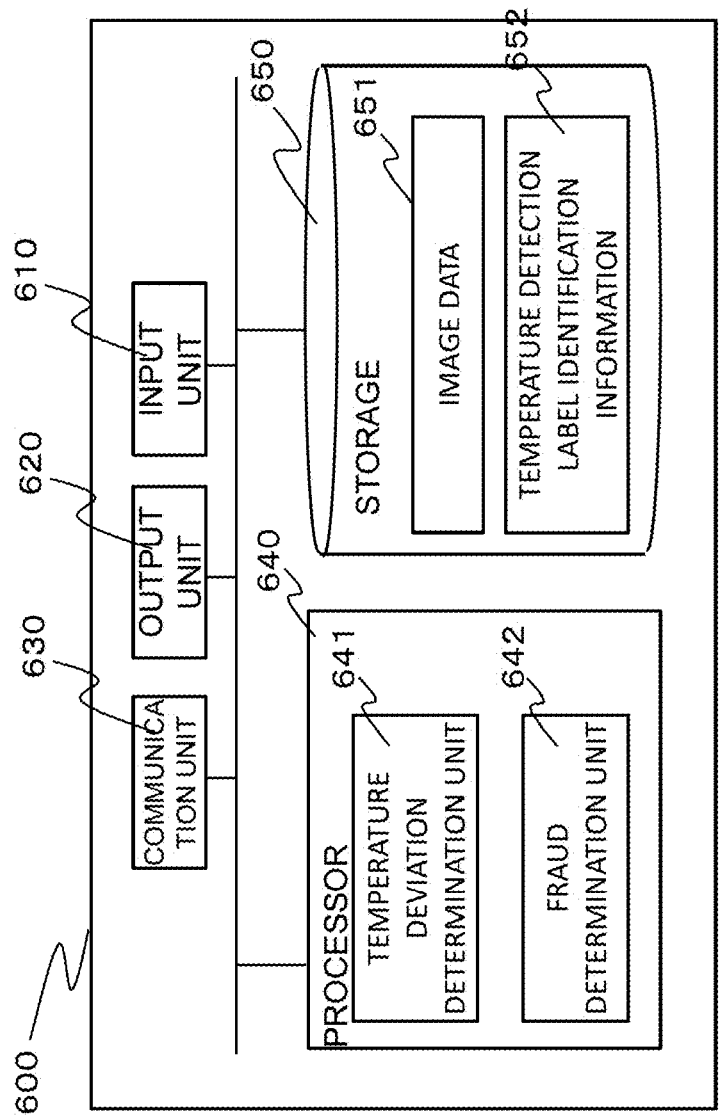
FIG. 23 is a configuration diagram of an article management device.

FIG. 23 is a configuration diagram of an article management device. The article management device 600 includes an input unit 610, an output unit 620, a communication unit (information acquisition unit) 630, a processor 640, and a storage unit 650. The communication unit 630 communicates with the terminal or the image pickup device placed on a transport path of a product via the network line. The processor 640 determines the presence or absence of the temperature deviation from the management environment and the presence or absence of fraud (initialization of the temperature detection material). The storage 650 stores therein images of the temperature detection label before and after the use, information about identification of the temperature detection label, information about an article, information regarding the transportation, and the like.

FIG. 24 shows a procedure of fraud detection. First, a management device acquires images of the temperature detection label before and after use. The images are acquired from the terminal or image pickup device at each location via the communication unit 630. The acquired images are stored in the storage 650. Then, a temperature deviation determination unit 641 of the processor determines the presence or absence of deviation from the management temperature, from the color of the temperature detection material in the image after the use of the temperature detection label. When the deviation from the management temperature is determined to be "absent", a fraud determination unit 642 of the processor determines the presence or absence of fraud (initialization of the temperature detection material) by comparing the temperature detection label before and after the use. For example, when using the temperature detection label according to the first embodiment, the presence or absence of fraud of the temperature detection label can be determined by comparing the color of the thermo-sensitive sheet before and after the use. The presence or absence of fraud can be determined from the shape of the heat-shrinkable film before and after the use when using the temperature detection label according to the second embodiment, from the locations of the high-melting-point material of the temperature detection part before and after the use when using the temperature detection label according to the third embodiment, from the color of the second region before and after the use when using the temperature detection label according to the fourth embodiment, and from the number, shape, or positions of the voids before and after the use when using the temperature detection label according to the fifth embodiment. The determination result about the presence or absence of the temperature deviation and the determination result about the presence or absence of the fraud are output by the output unit. The communication unit may transmit the determination result to the terminal at each location.

It is noted that the present invention is not limited to the above-mentioned embodiments and can include various modifications thereof. For example, the above-mentioned embodiments have been described in detail for easy understanding of the present invention, and are not necessarily limited to those having all the configurations described. A part of the configuration of one embodiment can be replaced with the configuration of another embodiment. The configuration of another embodiment can also be added to the configuration of one embodiment. Another configuration can be added, deleted, or replaced with respect to a part of the configuration of each embodiment.

LIST OF REFERENCE SIGNS

110 . . . Supporting member, 120 . . . Temperature detection material, 130 . . . Protective layer, 140 . . . Thermo-sensitive sheet, 210 . . . Low melting point film, 310 . . . High-melting-point material, 410 . . . Temperature detection material, 510 . . . Void, 600 . . . Management device, 610 . . . Input unit, 620 . . . Output unit, 630 . . . Communication unit, 640 . . . Processor, 650 . . . Storage

The invention claimed is:
1. A temperature detection label comprising:
a supporting member;
a temperature detection part provided in the supporting member; and
a protective layer provided to cover the temperature detection part, wherein
the temperature detection part includes a temperature detection material that in a heating process, starts color development at a temperature T1 and starts decoloring by being melted at a temperature T2 and, in a cooling process, solidifies while remaining decolored by being cooled to the temperature T1 or lower,
the temperature detection material includes a leuco dye, a decolorant, and a developer, and
the temperature detection label further comprises a member having an appearance that changes at a temperature equal to or higher than T1 and equal to or lower than T2, or a high-melting-point material having a melting point or glass transition point higher than T2 and 150° C. or higher.

2. The temperature detection label according to claim 1, wherein a change in the appearance of the member is one of a color change, a change in transparency, and a change in shape.

3. The temperature detection label according to claim 1, wherein the member is provided at the protective layer.

4. The temperature detection label according to claim 3, wherein the member is a thermo-sensitive sheet that irreversibly changes color thereof at a temperature equal to or higher than T1 and equal to or lower than T2.

5. An article management device comprising:
an information acquisition unit that acquires an image before use and an image after the use of the temperature detection label according to claim 4 affixed to an article; and
a processor that determines presence or absence of temperature deviation from a management environment, from color of the temperature detection material in the image after the use,
the processor being configured to determine presence or absence of initialization of the temperature detection material based on color of the thermo-sensitive sheet in the image before the use and color of the thermo-sensitive sheet in the image after the use when the temperature deviation is determined to be absent.

6. The temperature detection label according to claim 3, wherein the member is a film that irreversibly shrinks at a temperature equal to or higher than T1 and equal to or lower than T2.

7. An article management device comprising:
an information acquisition unit that acquires an image before use and an image after use of the temperature detection label according to claim 6 affixed to an article; and
a processor that determines presence or absence of temperature deviation from a management environment, from color of the temperature detection material in the image after the use,
the processor being configured to determine presence or absence of initialization of the temperature detection material based on a shape of the protective layer in the image before the use and a shape of the protective layer in the image after the use when the temperature deviation is determined to be absent.

8. The temperature detection label according to claim 6, wherein the member is made of a material having a melting point or glass transition point that is equal to or higher than T1 and equal to or lower than T2.

9. The temperature detection label according to claim 3, wherein the member is made of a material having a melting point or glass transition point that is higher than T2.

10. The temperature detection label according to claim 1, wherein the high-melting-point material is disposed in the temperature detection part and mixed with the temperature detection material.

11. An article management device comprising:
an information acquisition unit that acquires an image before use and an image after the use of the temperature detection label according to claim 10 affixed to an article; and
a processor that determines presence or absence of temperature deviation from a management environment, from color of the temperature detection material in the image after the use,
the processor being configured to determine presence or absence of initialization of the temperature detection material based on a location of the high-melting-point material in the image before the use and a location of the high-melting-point material in the image after the use when the temperature deviation is determined to be absent.

12. The temperature detection label according to claim 1, wherein
the temperature detection part has a first region made of the temperature detection material and a second region made of the member,
the second region is formed of a temperature detection material that is identical to the temperature detection material forming the first region, and
in an initial state at a temperature lower than T1, the first region is in a decolored state, and the second region is in a colored state.

13. A temperature detection label comprising:
a supporting member;
a temperature detection part provided in the supporting member; and
a protective layer provided to cover the temperature detection part, wherein
the temperature detection part includes a temperature detection material that in a heating process, starts color development at a temperature T1 and starts decoloring by being melted at a temperature T2 and, in a cooling process, solidifies while remaining decolored by being cooled to the temperature T1 or lower,
the temperature detection material includes a leuco dye, a decolorant, and a developer,
the temperature detection part further has voids in the temperature detection material, and
the temperature detection label further comprises a member having an appearance that changes at a temperature equal to or higher than T1 and equal to or lower than T2, or a high-melting-point material having a melting point or glass transition point higher than T2 and 150° C. or higher.

14. An article management device comprising:
an information acquisition unit that acquires an image before use and an image after the use of the temperature detection label according to claim 13 affixed to an article; and
a processor that determines presence or absence of temperature deviation from a management environment, from color of the temperature detection material in the image after the use,
the processor being configured to determine presence or absence of initialization of the temperature detection material based on shape or number of the voids in the image before the use and shape or number of the voids in the image after the use when the temperature deviation is determined to be absent.

* * * * *